(12) United States Patent
Matsumoto

(10) Patent No.: US 10,618,357 B2
(45) Date of Patent: Apr. 14, 2020

(54) STUD PIN, AND PNEUMATIC TIRE

(71) Applicant: The Yokohama Rubber Co., LTD., Minato-ku, Tokyo (JP)

(72) Inventor: Kenichi Matsumoto, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 187 days.

(21) Appl. No.: 15/582,374

(22) Filed: Apr. 28, 2017

(65) Prior Publication Data

US 2017/0313138 A1    Nov. 2, 2017

(30) Foreign Application Priority Data

Apr. 28, 2016   (JP) .................................. 2016-090312

(51) Int. Cl.
*B60C 11/16* (2006.01)
*B60C 11/14* (2006.01)

(52) U.S. Cl.
CPC ...... *B60C 11/1675* (2013.01); *B60C 11/1668* (2013.01); *B60C 11/16* (2013.01); *B60C 11/1643* (2013.01); *B60C 11/1656* (2013.01)

(58) Field of Classification Search
CPC ........................... B60C 11/1643; B60C 11/16
USPC ................................................. 152/210–212
See application file for complete search history.

(56) References Cited

U.S. PATENT DOCUMENTS

2014/0326384 A1    11/2014  Fabing et al.

FOREIGN PATENT DOCUMENTS

| DE | 1903668 A1 | * | 8/1970 | ............. B60C 11/16 |
|---|---|---|---|---|
| DE | 2351803 A1 | * | 4/1975 | ............. B60C 11/16 |
| JP | S61-015609 | | 1/1986 | |
| JP | 5571207 | | 8/2014 | |
| WO | WO 2013/092434 | | 6/2013 | |
| WO | WO 2014/102936 | | 7/2014 | |
| WO | WO 2014/123181 | | 8/2014 | |

OTHER PUBLICATIONS

Machine Translation: DE-1903668-A1; Cantz Rudolf; (Year: 2019).*
Machine Translation: DE-2351803-A1; Brenner Franz; (Year: 2019).*

* cited by examiner

*Primary Examiner* — Kendra Ly
(74) *Attorney, Agent, or Firm* — Thorpe North & Western

(57) ABSTRACT

A stud pin includes a tip including a tip end surface configured to come into contact with a road surface and a trunk portion that supports the tip and extends in one direction. The trunk portion includes an upper flange disposed at a first end of the trunk portion, the tip being fixed to the upper flange, and a lower flange disposed at a position to a side opposite the upper flange of the trunk portion. An upper end surface of the upper flange from which the tip protrudes includes a recessed surface, the recessed surface including a smooth inclined surface recessing in a curved manner or a linear manner toward the lower flange with advancement toward a protruding base portion of the tip.

10 Claims, 6 Drawing Sheets

STUD PIN, AND PNEUMATIC TIRE

RELATED APPLICATIONS

This application is based upon and claims the benefit of priority from Japanese Patent Application No. 2016-090312, filed Apr. 28, 2016, the entire contents of which is incorporated herein by reference.

TECHNICAL FIELD

The present technology relates to a stud pin installable in a tread portion of a pneumatic tire, and a pneumatic tire including the stud pin.

BACKGROUND ART

Conventional winter tires (hereinafter, also simply referred to as tire(s)) provide grip on icy road surfaces via stud pins installed into a tread portion of the tires.

Typically, when a tire including a stud pin travels on icy road surfaces, the ice powder dug up by the stud pins may enter the space between the tread surface and the icy road surface. Such a layer of ice powder reduces the ability of the stud pins to break into the ice. As a result, the grip on icy road surfaces provided by the stud pins is decreased.

Whereas, a studdable tire is known that is capable of providing high steering stability performance by suppressing the coat of ice powder to the stud pin, the ice powder dug up while traveling on icy road surfaces (Japanese Patent No. 5571207).

Such a studdable tire includes intra-land grooves and communicating grooves communicating the intra-land grooves with the lug grooves. Each intra-land groove has both ends thereof terminating within a land portion and formed on each of a step-in side and a kick-out side of the land portion within a region enclosed by two circles of different radii having a center concentrical to a center of a stud hole on a land surface of a tread.

Additionally, a stud pin with improved performance on ice is known (International Patent Application Publication No. WO/2014/102936). This stud pin includes a shank portion that has an end surface, a flange portion provided on a base end of the shank portion, and an uneven portion disposed on the end surface of the shank portion. The uneven portion is constituted of either convex portions or concave portions with respect to a ground contact reference plane.

The studdable tire described above including the intra-land grooves and communicating grooves disposed around the stud hole on the land surface of the tread can reduce ice powder attached to stud pins, however the degree to which this is achieved is not always sufficient.

Additionally, the recess portion, which is concave with respect to the ground contact reference plane, radially extending centered at the center of the tip surface where a tip is disposed of the stud pin cannot reduce ice powder attached to the stud pin.

SUMMARY

The present technology provides a stud pin and a pneumatic tire including the stud pin capable of sufficiently reducing ice powder attached to stud pins and good performance on ice.

An aspect of the present technology is a stud pin embeddable in a pin embedding hole provided in a tread portion of a pneumatic tire.

The stud pin includes a tip including a tip end surface configured to come into contact with a road surface and a trunk portion that supports the tip and extends in one direction.

The trunk portion includes an upper flange disposed at a first end of the trunk portion, the tip being fixed to the upper flange, and a lower flange disposed at a position to a side opposite the upper flange of the trunk portion. An upper end surface of the upper flange from which the tip protrudes includes a recessed surface, the recessed surface including a smooth inclined surface recessing in a curved manner or a linear manner toward the lower flange with advancement toward a protruding base portion of the tip.

An inclination angle of the inclined surface with respect to an orthogonal plane orthogonal to an extending direction of the trunk portion preferably decreases with advancement toward the protruding base portion of the tip.

The upper end surface preferably includes a flat surface orthogonal to an extending direction of the trunk portion, and the recessed surface is preferably surrounded by the flat surface.

A depth at a most recessed position of the recessed surface is preferably from 0.3 mm to 2.0 mm, both inclusive.

A distance W2 is preferably 0.3 times (30%) or greater a distance W1, where the distance W1 is a distance along a straight line orthogonal to and passing through a central axis of the tip that extends in an extending direction of the trunk portion from an edge of the upper flange to a position at the protruding base portion of the tip, and the distance W2 is a distance along the straight line from a position where the recessed surface begins to recess to a position at the protruding base portion of the tip.

In a cross section of the upper flange and the tip taken along a plane parallel to and including a central axis of the tip that extends in an extending direction of the trunk portion, the cross section being represented in an X-Y coordinate system where the extending direction toward the tip end surface is defined as a y direction, a direction orthogonal to the extending direction extending outward from the stud pin is defined as an x direction, and a position of the protruding base portion of the tip is defined as an origin point of the X-Y coordinate system, an inclination angle with respect to an x direction at a discretionary position D on a curved or a straight line corresponding to the inclined surface is preferably larger than an inclination angle with respect to the x direction at a same position in the x direction as the position D on a parabola, the parabola passing on the origin point and having a focus point at a point on the tip end surface that is located at a same position in the x direction as the origin point.

Also, another aspect of the present technology is a pneumatic tire.

The pneumatic tire includes a tread portion provided with pin embedding holes and stud pins installed in the pin embedding holes.

The aspects of the stud pin and pneumatic tire described above are capable of sufficiently reducing ice powder attached to stud pins and good performance on ice.

DETAILED DESCRIPTION

Overall Explanation of the Tire

Figure 1:
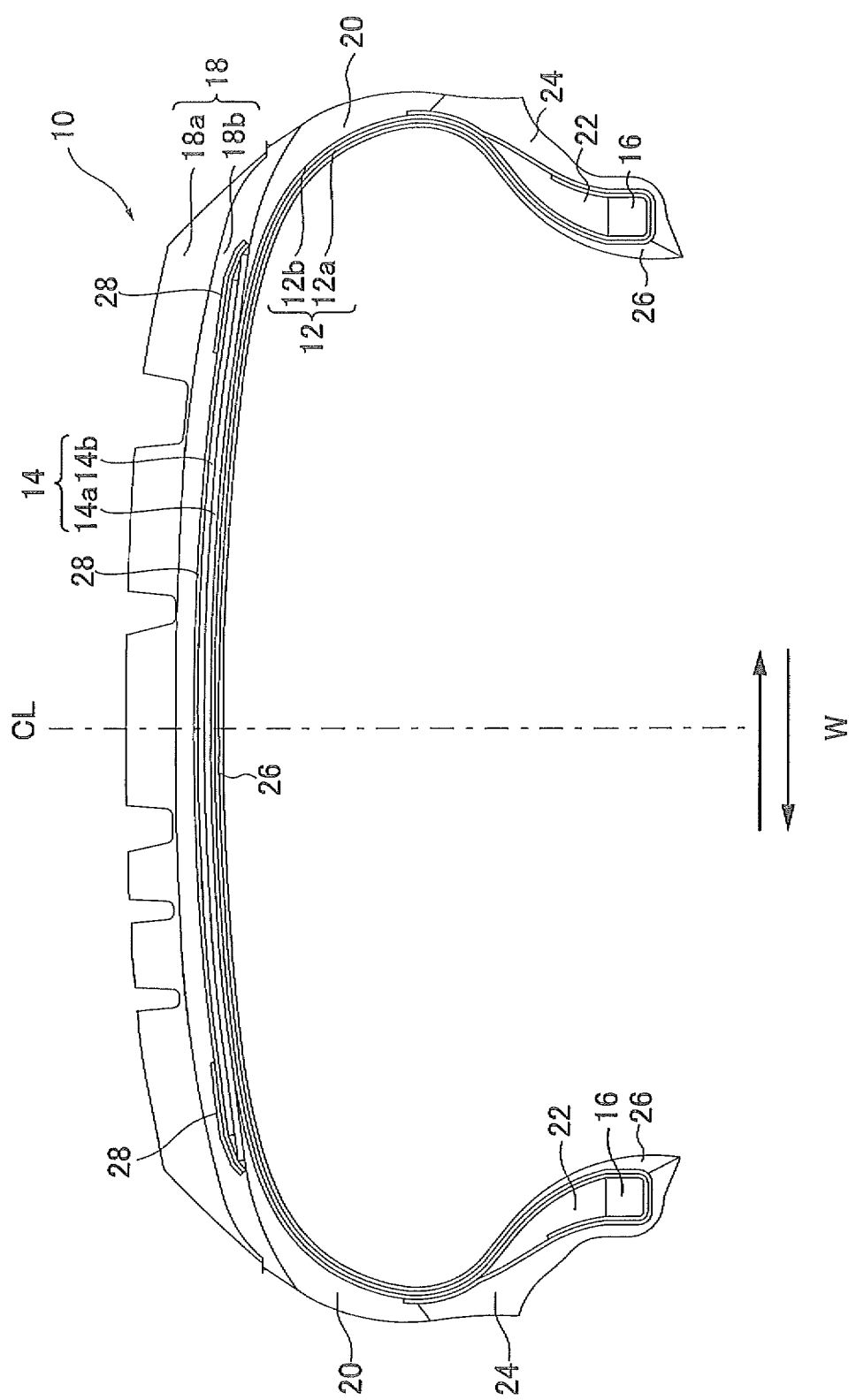
FIG. 1 is a tire cross-sectional view illustrating an example of a cross-section of a tire of a present embodiment.
Figure 2:
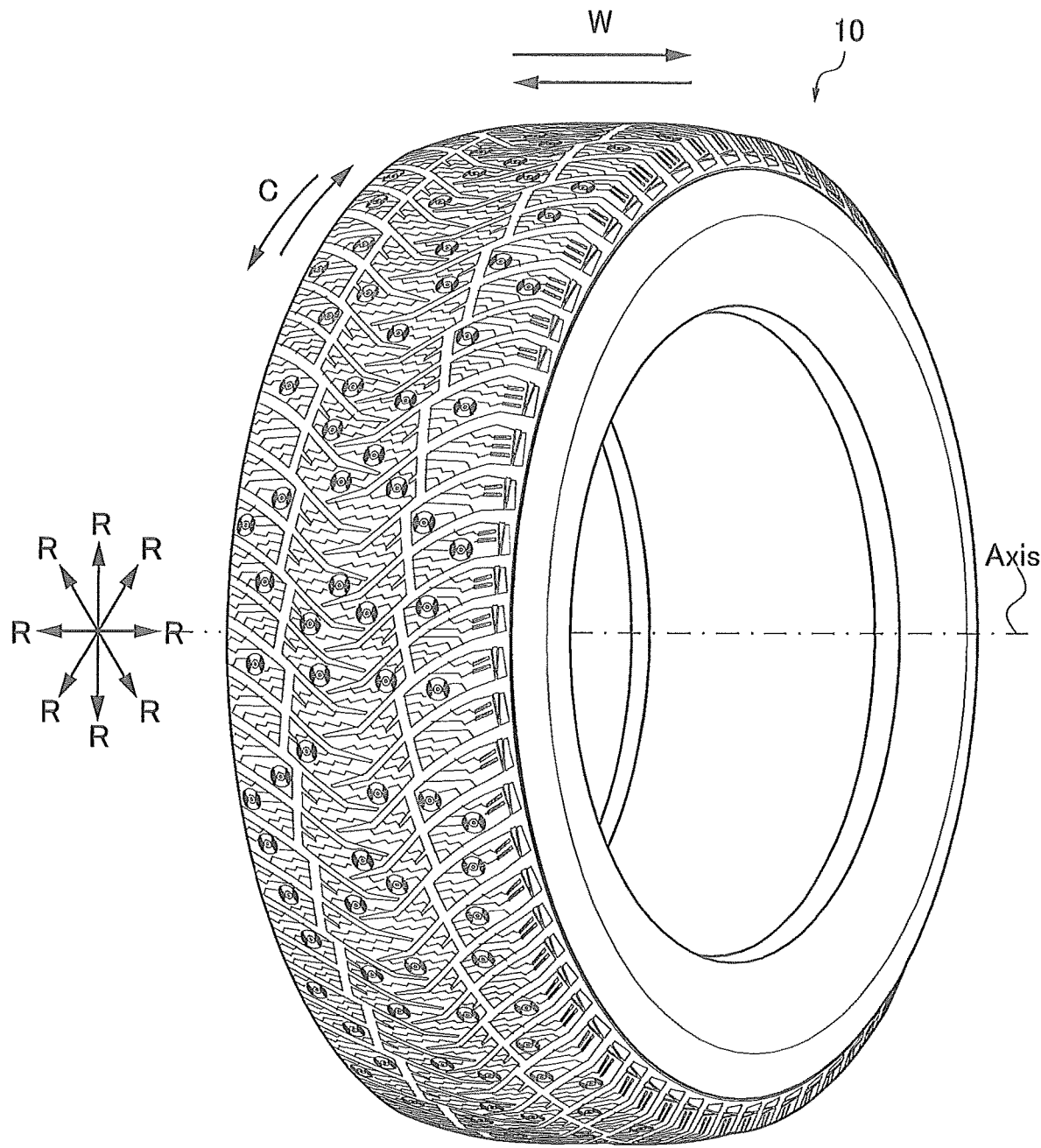
FIG. 2 is a perspective view of the tire of the present embodiment.

Hereinafter, a studded tire of the present embodiment is described. FIG. 1 is a tire cross-sectional view illustrating an example of a cross section of a studded tire (hereinafter also referred to as "tire") 10 of the present embodiment. FIG. 2 is a perspective view of the tire 10. The tire 10 is a tire with stud pins 50 (see FIG. 4A) embedded in a tread portion (the stud pins 50 are not illustrated in FIGS. 1 and 2). The tire 10 is, for example, used for a passenger vehicle. A tire for a passenger vehicle refers to a tire defined according to Chapter A of the JATMA Yearbook 2012 (standards of The Japan Automobile Tyre Manufacturers Association, Inc.). The tire 10 can also be a small truck tire as defined in Chapter B or a truck tire or bus tire as defined in Chapter C. Below, values of the dimensions of various pattern elements are described in detail as example values for a tire for a passenger vehicle. However, the studded tire of the present technology is not limited to these example values.

A tire circumferential direction C (see FIG. 2) in the following description is defined as the direction the tread surface rotates (both rotational directions) when the tire 10 is rotated about a tire rotational axis Axis (see FIG. 2). A tire radial direction is defined as the radiation direction R extending orthogonal to the tire rotational axis Axis. An outer side in the tire radial direction is defined as the side distanced from the tire rotational axis in the tire radial direction. A tire width direction W is defined as the direction parallel to the tire rotational axis Axis. An outer side in the tire width direction is defined as both sides distanced from a tire equator line CL of the tire 10 (see FIG. 3).

Tire Structure

The tire 10 includes a carcass ply layer 12, a belt layer 14, and bead cores 16 as skeleton members. The tire 10 also mainly includes a tread rubber 18, side rubbers 20, bead filler rubbers 22, rim cushion rubbers 24, and an inner liner rubber 26, around these skeleton members.

The carcass ply layer 12 includes carcass ply members 12a, 12b that are formed from organic fibers covered with rubber and that are wound between the pair of bead cores 16 of an annular shape so as to be formed into a toroidal shape. In the tire 10 illustrated in FIG. 1, the carcass ply layer 12 is made of the carcass ply members 12a and 12b, but may also be made of a single carcass ply member. The belt layer 14 is provided on the outer side in the tire radial direction of the carcass ply layer 12, and is constituted by two belt members 14a, 14b. The belt layer 14 is a member formed from steel cords covered with rubber, the steel cords being arranged inclined at a predetermined angle, for example, 20 to 30 degrees, with respect to the tire circumferential direction C. The width in the tire width direction W of the belt member 14a that is a lower layer is greater than the width of the belt member 14b that is the upper layer. The steel cords of the two layers of the belt members 14a and 14b are inclined from the tire circumferential direction C toward the tire width direction W in mutually different directions. As such, the belt members 14a, 14b are crossing layers serving to suppress expansion of the carcass ply layer 12 due to the pressure of the air in the tire 10.

The tread rubber 18 is provided on the outer side of the belt layer 14 in the tire radial direction. Both end portions of the tread rubber 18 are connected with the side rubbers 20 to form sidewall portions. The tread rubber 18 is made of two layers of rubber, namely an upper layer tread rubber 18a provided on the outer side in the tire radial direction and a lower layer tread rubber 18b provided on the inner side in the tire radial direction. The rim cushion rubbers 24 are provided at the ends of the side rubbers 20 on the inner side in the tire radial direction, and come into contact with the rim on which the tire 10 is mounted. The bead filler rubbers 22 are provided on the outer side of the bead cores 16 in the tire radial direction so as to be interposed between a portion of the carcass ply layer 12 prior to being wound around the bead cores 16 and a portion of the carcass ply layer 12 after being wound around the bead cores 16. The inner liner rubber 26 is provided on an inner surface of the tire 10 facing a tire cavity region that is filled with air and is surrounded by the tire 10 and the rim.

In addition, the tire 10 includes a belt cover layer 28 formed from organic fiber covered with rubber that covers the belt layer 14 from the outer side in the tire radial direction of the belt layer 14.

The tire 10 has such a tire structure, but the tire structure of the present embodiment is not limited to the tire structure illustrated in FIG. 1.

Tread Pattern

Figure 3:
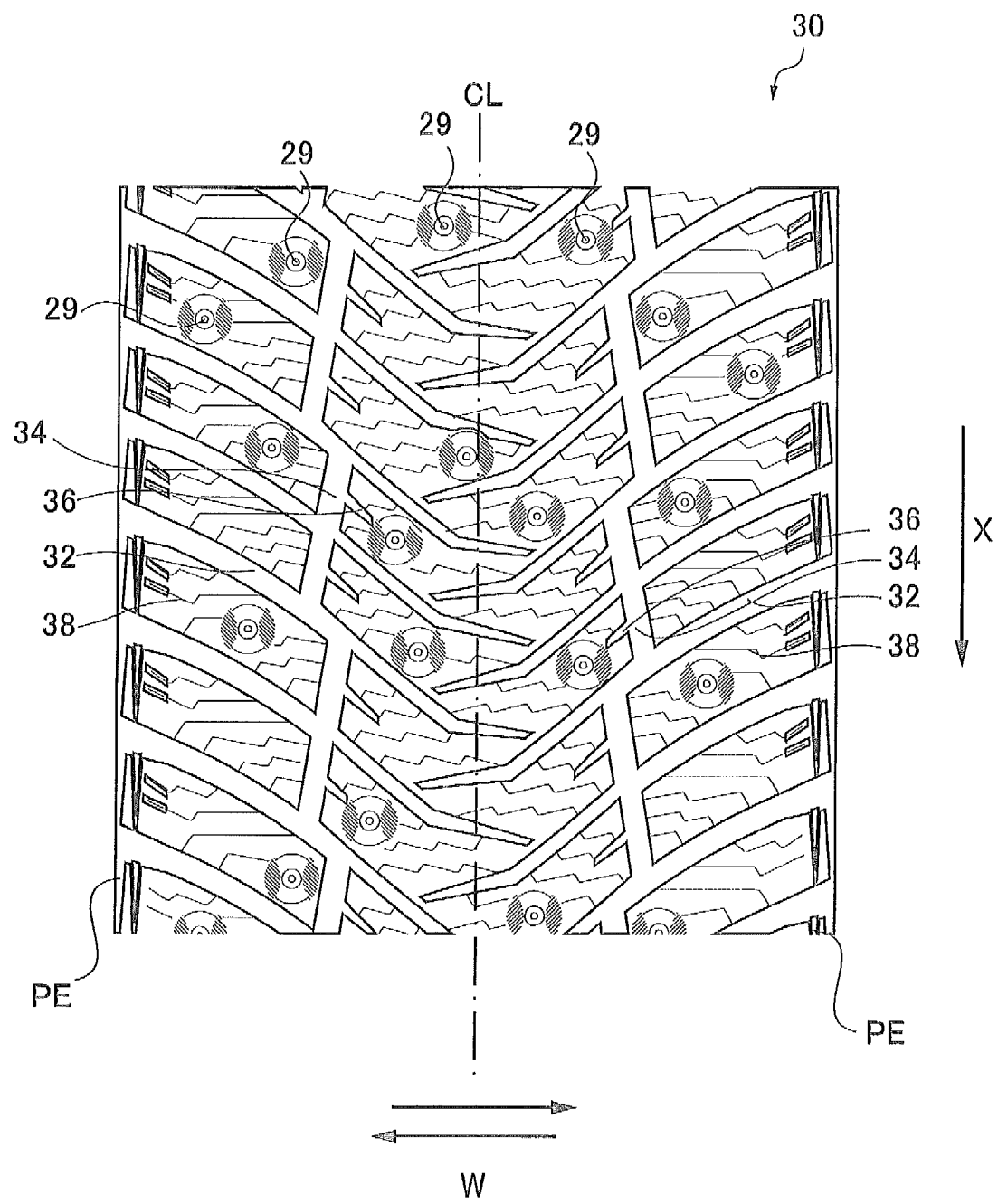
FIG. 3 is a planar development diagram illustrating a portion of an example of a tread pattern of a studded tire of the present embodiment, developed on a plane.

FIG. 3 is a planar development diagram illustrating a portion of an example of the tread pattern, namely a tread pattern 30, of the tire 10 developed on a plane. In FIG. 3, the stud pins 50 installed into the tread portion are omitted from the illustration. As illustrated in FIG. 3, the tire 10 has a designated rotational direction X indicating a one-way direction along the tire circumferential direction. Information of the rotational direction X is shown by an information display portion including numbers, symbols, and the like (e.g. an arrow symbol) on the sidewall surface of the tire 10. The stud pins 50 (see FIG. 4A) are installed in a plurality of pin embedding holes (also referred to as stud pin installation holes) 29 illustrated in FIG. 3.

The tread pattern 30 includes an inclined groove 32, a circumferential direction communicating grove 34, a projecting groove 36, and a sipe 38.

The inclined groove 32 is formed in plurality at a predetermined pitch in the tire circumferential direction (the vertical direction in FIG. 3).

The inclined groove 32 extends in a direction opposite (the up direction in FIG. 3) the tire rotational direction X (the down direction in FIG. 3) and outward in the tire width direction. The inclined groove 32 has a starting edge at a position near the tire equator line CL on one side in the tire width direction W across the tire equator line CL, crosses the tire equator line CL and advances toward the other side in the tire width direction W, and ends at a pattern end PE.

The groove width of the inclined groove 32 gradually increases from the starting edge near the tire equator line CL. The inclination with respect to the tire width direction W of the inclined groove 32 is smallest in a region near the tire equator line CL including the starting edge and, after crossing the tire equator line CL, bends so as that the angle of inclination with respect to the tire width direction W increases, and advances outward in the tire width direction in a direction opposite the tire rotational direction X. Furthermore, the inclination angle gradually decreases with advancement outward in the tire width direction. The inclined groove 32 configured as described above is provided on both sides across the tire equator line CL.

The inclined groove 32 provided on one side across the tire equator line CL of the tread portion is offset with respect to the tire circumferential direction C from the inclined groove 32 provided on the other side. The starting edge of the inclined groove 32 provided on one side is configured so as not to connect with the inclined groove 32 provided on the other side.

Of the plurality of inclined grooves 32 provided in the tire circumferential direction C, the inclined grooves 32 that are adjacent are in communication via the circumferential direction communicating groove 34. More specifically, the circumferential direction communicating groove 34 extends in the tire circumferential direction C from a position partway along one of the inclined grooves 32, crosses a second inclined groove 32 that is adjacent to the first inclined groove 32 in the tire circumferential direction C, and advances to a third inclined groove 32 that is adjacent to the second inclined groove 32. That is, the circumferential direction communicating groove 34 starts at one of the inclined grooves 32 (first inclined groove 32), extends along the tire circumferential direction C from the first inclined groove 32 at which the circumferential direction communicating groove 34 starts, and terminates at a second inclined groove 32. The circumferential direction communicating groove 34 is provided so as to connect three of the inclined grooves 32 that are adjacent along the tire circumferential direction C. The circumferential direction communicating groove 34 is inclined with respect to the tire circumferential direction C so as to approach the tire equator line CL with advancement in the direction opposite to the tire rotational direction X.

The projecting groove 36 projects in a direction toward the tire equator line CL from the circumferential direction communicating groove 34, and is provided so as to terminate prior to reaching the tire equator line CL.

Land portions of the tread portion are separated into a center region and shoulder regions by the inclined grooves 32 and the circumferential direction communicating grooves 34. A plurality of the sipes 38 connected to the inclined grooves 32 and the circumferential direction communicating grooves 34 is provided in the center region and both of the shoulder regions of the tread portion.

Furthermore, the plurality of the pin embedding holes 29 is provided in the center region and both of the shoulder regions of the tread portion.

The inclined groove 32, the circumferential direction communicating groove 34, and the projecting groove 36 have groove depths, for example, from 8.5 mm to 10.5 mm, and groove widths thereof equal to or less than 12 mm. The tread pattern 30 illustrated in FIG. 3 is an example, and the tread pattern of the tire in which the stud pin is to be inserted of the present embodiment is not limited thereto.

Stud Pin

Figure 4A:
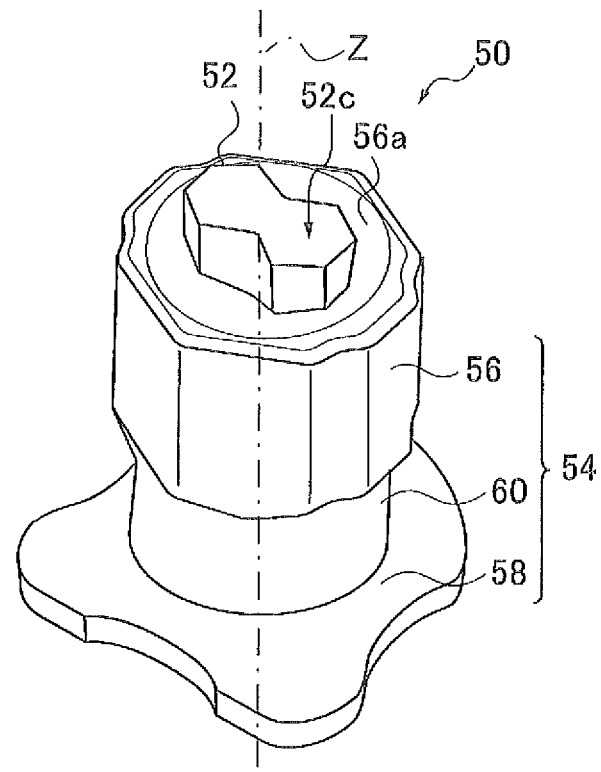
FIGS. 4A and 4B are drawings illustrating an example of a stud pin of the present embodiment.
Figure 4B:
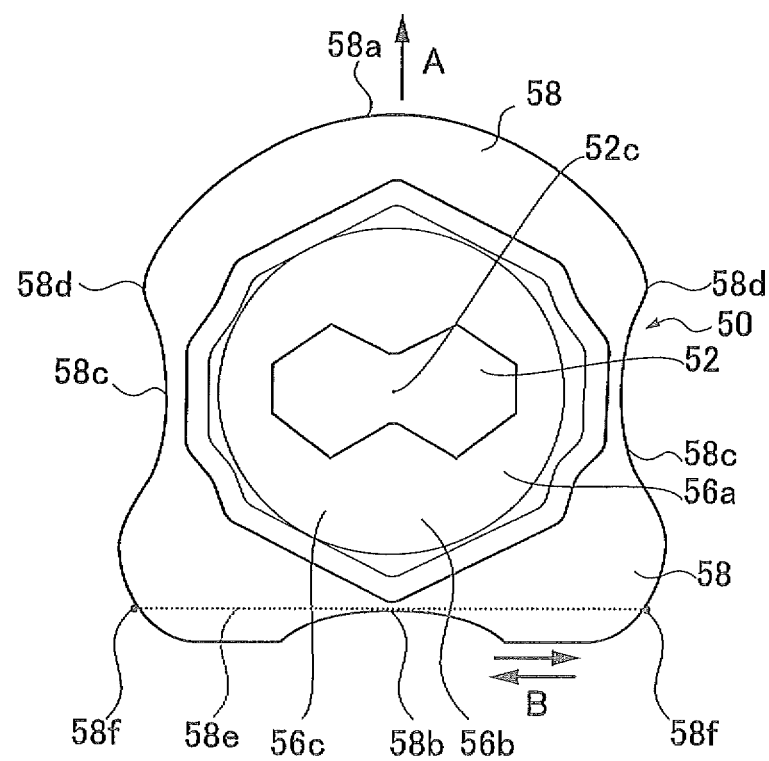

FIG. 4A is a perspective view illustrating the stud pin 50 of the present embodiment. FIG. 4B is a plan view of the stud pin 50, and is a drawing illustrating a lower flange 58 of the stud pin 50 when viewed from an extending direction of a trunk portion 54.

The stud pin 50 includes a tip 52 and a trunk portion 54. The trunk portion 54 includes an upper flange 56, a lower flange 58, and a shank portion 60. When installed in the pin embedding holes 29 of the tire 10, the trunk portion 54 is embedded in the tread rubber 18 (see FIG. 1) and is configured to come in contact with the tread rubber 18.

The tip 52 has a tip end surface 52c (see FIG. 6 described below) that comes into contact with a road surface. The tip 52 is formed from tungsten carbide or a similar hard metal. Additionally, the tip 52 may be formed from a cermet material. The tip 52 is fixed in a hole provided in the upper end surface 56a of the trunk portion 54. The tip 52 of the stud pin 50 is configured so as to protrude from the tread surface when the stud pin 50 is installed in the tire 10.

The trunk portion 54 supports the tip 52 and extends in one direction.

The upper flange 56 of the trunk portion 54 is configured so that, when embedded in the tread portion of the tire 10, the tip 52 protrudes from the tread surface. The tip 52 is fixed to the end of the upper flange 56 of the trunk portion 54.

The lower flange 58 is configured so as to be in contact with a bottom of the pin embedding hole 29, when embedded in the tread portion of the tire 10. The lower flange 58 is provided at a position on a side opposite the end of the upper flange 56 of the trunk portion 54.

The shank portion 60 is a portion that connects the upper flange 56 with the lower flange 58. The shank portion 60 is narrower than the upper flange 56 and the lower flange 58 when viewed in a cross section orthogonal to the extending direction of the trunk portion 54.

Material of the trunk portion 54 is not particularly limited and, for example, the trunk portion 54 may be formed from aluminum alloy or the like in order to reduce the weight of the stud pin 50.

Here, the upper flange 56 and the lower flange 58 of the trunk portion 54 include side surfaces extending in parallel to the extending direction of the stud pin 50.

When the upper flange 56 is viewed from the extending direction of the trunk portion 54, an edge defining a peripheral shape of the upper flange 56 forms a deformed hexagonal shape in which the six vertices are rounded and a portion of four of the sides is recessed. This shape is only an example and, as illustrated in FIG. 4B, the shape of the edge of the upper flange 56 is not particularly limited provided that the lower flange 58 is larger than the upper flange 56 when the trunk portion 54 is viewed from the extending direction of the trunk portion 54, and may be any other known shape.

Regarding the lower flange 58, when the lower flange 58 is viewed from the extending direction of the trunk portion 54 (the axial direction of the central axis Z), as illustrated in FIG. 4B, an edge defining a peripheral shape of the lower flange 58 includes a first side 58a and a second side 58b.

The first side 58a has a shape roundly protruding toward an outer side of the lower flange 58, and protrudes in a first direction A orthogonal to the extending direction of the trunk portion 54 (the axial direction of the central axis Z).

As illustrated in FIG. 4B, the second side 58b is provided on a side opposite to the first side 58a with respect to the tip disposal position where the tip 52 is provided and specifically on a center position of the tip 52 (or the central position in the drawing of the tip end surface 52c). The second side 58b extends in a second direction B orthogonal to the first direction A and the extending direction of the trunk portion 54, and includes a recess that is recessed toward an inner side of the lower flange 58.

In the edge defining the peripheral shape of the lower flange 58, a pair of third sides 58c are provided that connect the first side 58a and the second side 58b. Each of the third sides 58c extends in the first direction A. As illustrated in FIG. 4B, in cases where recesses are provided in the third sides 58c, the first side 58a is formed between points 58d, where each of the third sides 58c and the recesses begin.

Additionally, a pair of points 58f, where the edge of the lower flange 58 meets a straight line 58e, is formed as the edges of the second side 58b. The straight line 58e is parallel to the second direction B and passes through a position where the recess provided in the second side 58b is most recessed. Accordingly, in the example illustrated in FIG. 4B, the third sides 58c are portions of straight lines or curved lines between each of the points 58f and each of the points 58d.

The rounded shape of the first side 58a is preferably an arc shape of a perfect circle having a center thereof at the center position (position of central axis Z) or an oval in the view of the suppression of damage to the walls of the pin embedding holes 29, but other curved shapes are also acceptable.

The second side 58b may be of a shape including two straight lines and a recessed portion positioned between the two straight lines, or the shape of the portions on either side of the recess may be a curved shape forming a shape that protrudes toward the outer side of the lower flange 58, instead of being a straight line shape. Additionally, the recess of the second side 58b may be formed as a curving recessed shape, or may be formed as a recessed shape in which two straight lines are combined to form a V shape.

The recesses of the third sides 58c may be formed as curving recessed shapes, or may be formed as recessed shapes in which two straight lines are combined to form a V shape. These shapes of the edge of such a lower flange 58 are only examples, and the shapes of the edge of the lower flange 58 of the stud pin 50 of the present embodiment are not particularly limited and may be any other known shape.

Figure 5:
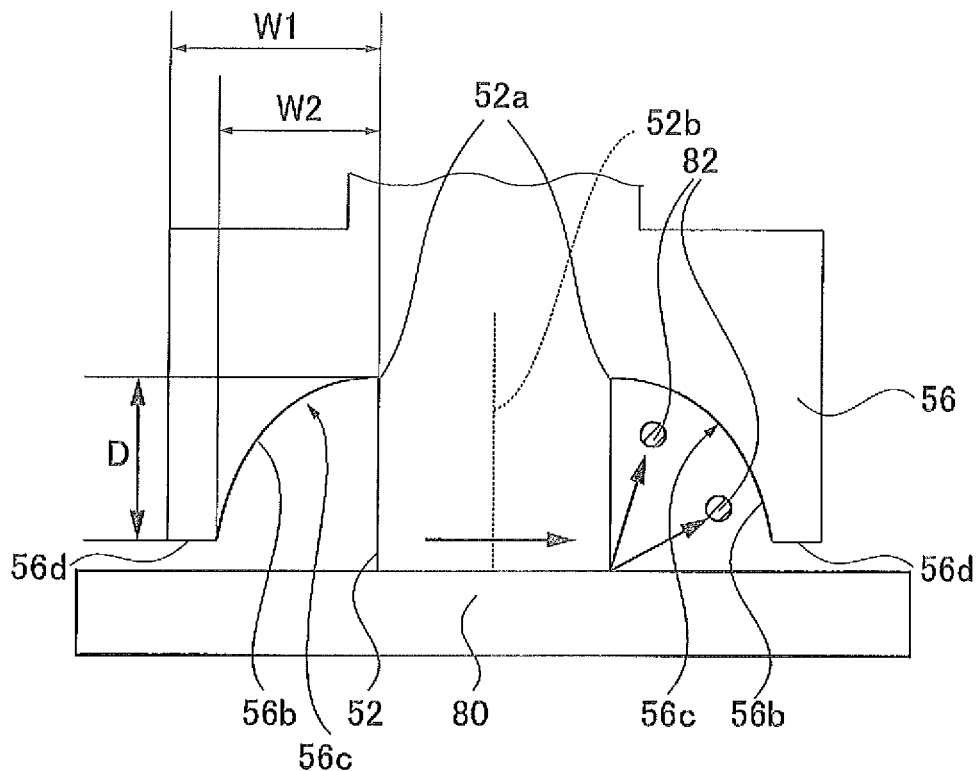
FIG. 5 is a drawing of the stud pin of the present embodiment for explaining the paths of the ice powder shaved off by a tip.

In the stud pin 50 of the present embodiment, the upper end surface 56a of the upper flange 56 from which the tip 52 protrudes includes a recessed surface 56c. The recessed surface 56c includes a smooth inclined surface 56b recessing in a curved manner or a linear manner to the lower flange 58 with advancement toward a protruding base portion 52a of the tip 52 (see the description of FIG. 5 below). Accordingly, the tip 52 protrudes from the recessed surface 56c, or in other words, the protruding base portion 52a of the tip 52 is surrounded by the recessed surface 56c. The protruding base portion 52a is defined as the edge portion of the tip 52 where the tip 52 protrudes from the upper end surface 56a (or the recessed surface 56c). The upper end surface 56a is provided with the recessed surface 56c in such a manner to prevent the formation of a layer of ice powder 82 between the tip 52 and the icy road surface 80 by collecting the ice powder 82 in the space enclosed by the recessed surface 56c and the icy road surface 80, the ice powder 82 being shaved off from the icy road surface 80 by the stud pins 50 at the time of application of brakes on the tire 10. FIG. 5 is a drawing for explaining the paths of the ice powder 82 shaved off by the tip 52.

As illustrated in FIG. 5, upon breaking, the tip 52 moves in one direction relative to the icy road surface 80 (in FIG. 5, the direction of the arrow). Thus, the edge of the end of the tip 52 moving in a direction relative to the icy road surface 80, shaves the icy road surface 80 and scatters the ice powder 82. Because the scattered ice powder 82 is kept in the space enclosed by the recessed surface 56c and the icy road surface 80, formation of a layer of the ice powder 82 on the icy road surface 80 is prevented. Accordingly, the present embodiment suppresses the formation of a layer of the ice powder 82 between the tip end surface 52c and the icy road surface 80, allowing the stud pin 50 to reliably come into contact with the icy road surface 80. As a result, good performance on ice is achieved. Note that as the tire 10 rotates and the stud pins 50 move from a contact region where the stud pins 50 are in contact with the icy road surface 80 to a non-contact region, the ice powder 82 collected in the space enclosed by the recessed surface 56c and the icy road surface 80 is effected by centrifugal force and scattered out around the tire 10. Thus, when the stud pins 50 move to a contact region where the stud pins 50 are in contact with the icy road surface 80 upon the next rotation of the tire, no ice powder 82 is present in the space enclosed by the recessed surface 56c and the icy road surface 80. Thus, accumulation of ice powder 82 on the recessed surface 56c is prevented.

In the present embodiment, the inclination angle of the inclined surface 56b with respect to an orthogonal plane orthogonal to the extending direction of the trunk portion 54 preferably decreases with advancement toward the protruding base portion 52a of the tip 52, as illustrated in FIG. 5. Accordingly, the region for collecting the ice powder 82 is enlarged, allowing the ice powder 82 to be reliably and sufficient kept in the space enclosed by the recessed surface 56c and the icy road surface 80. The orthogonal plane orthogonal to the extending direction is a lateral direction in FIG. 5. In the example illustrated in FIG. 5, the inclination angle of the inclined surface 56b is the inclination angle of the tangent line at each point on the curved line that represents the inclined surface 56b with respect to the horizontal plane. The inclination angle is also the angle made between the tangential plane at each point on the inclined surface 56b and the orthogonal plane orthogonal to the extending direction of the trunk portion 54.

In the present embodiment, the upper end surface 56a of the upper flange 56 is preferably provided with a flat surface 56d orthogonal to the extending direction of the trunk portion 54 (in the example illustrated in FIG. 5, the straight line extending in the horizontal direction). Additionally, the recessed surface 56c is preferably surrounded by the flat surface 56d. By the flat surface 56d being provided, when the upper end surface 56a of the upper flange 56 is viewed from the extending direction of the trunk portion 54 (central axis Z direction), the edge of the recessed surface 56c (the contour at the position where the recessed surface 56c begins to recess) is positioned further inward than the edge of the outer perimeter of the upper flange 56. Accordingly, when the tip 52 comes into contact with the icy road surface 80, the amount of ice powder 82 discharged out from the gap between the upper end surface 56a and the icy road surface 80 can be reduced, and the scattering in all directions of the ice powder 82 when the stud pins 50 are in contact with the icy road surface 80 can be efficiently suppressed.

Note that the shape of the edge of the recessed surface 56c when viewed from the extending direction of the trunk portion 54 (central axis Z direction) may be circular or elliptical. However, the shape is not limited and may be a shape that conforms to the shape of the edge of the upper flange 56 when viewed from the extending direction of the trunk portion 54.

In the present embodiment, a depth D (see FIG. 5) at the most recessed position of the recessed surface 56c is preferably from 0.3 mm to 2.0 mm, both inclusive. The depth D is more preferably from 0.3 mm to 1.0 mm, both inclusive. Setting the depth D to 0.3 mm or greater allows the ice powder 82 to be sufficiently collected in the space enclosed by the recessed surface 56c and the icy road surface 80. Setting the depth D greater than 2.0 mm results in the mechanical strength of the upper flange 56 decreasing and the susceptibility to damage increasing.

A distance W1 (see FIG. 5) is defined as the distance along a straight line orthogonal to and passing through a central axis 52b from a position of the edge of the upper flange 56 to a position of the protruding base portion 52a of the tip 52. The tip 52 of the present embodiment has the central axis 52b that extends in the extending direction of the trunk portion 54. Additionally, a distance W2 (see FIG. 5) is defined as the distance along a straight line orthogonal to the central axis 52b from a position where the recessed surface 56c begins to recess, i.e. the position of the edge of the recessed surface 56c, to a position of the protruding base portion 52a of the tip 52. When defined as such, the distance W2 is preferably 0.3 times (30%) or greater the distance W1 and more preferably 0.5 times (50%) or greater. The distance W2 is preferably 0.7 times (70%) or less the distance W1 and more preferably 0.65 times (65%) or less. Setting the distance W2 to less than 0.3 times the distance W1 results in insufficient space for collecting the ice powder 82. Setting the distance W2 to greater than 0.7 times the distance W1 results in the mechanical strength of the upper flange 56 decreasing and the susceptibility to damage increasing.

Figure 6:
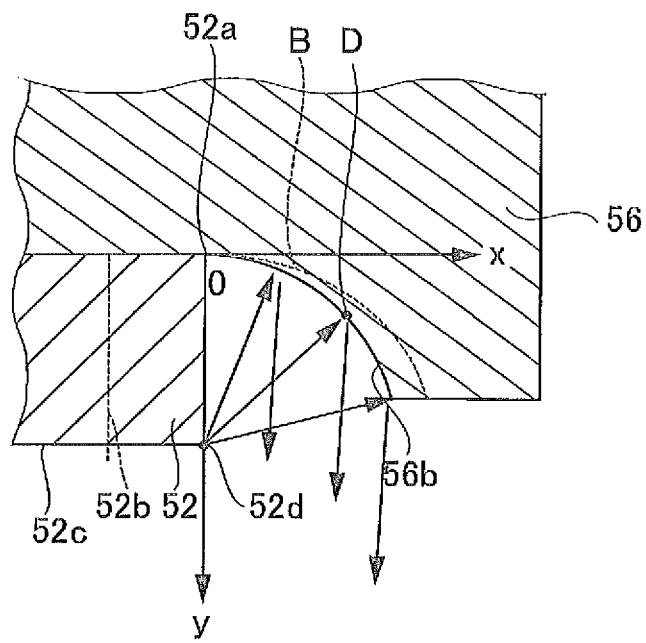
FIG. 6 is a drawing for explaining the shape of an inclined surface provided on an upper flange of the stud pin of the present embodiment.

Additionally, when the upper flange 56 and the tip 52 are viewed in a cross section taken along a plane parallel to and including the central axis 52b of the tip 52, as illustrated in FIG. 6, the direction in the extending direction from the protruding base portion 52a of the tip 52 toward the tip end surface 52c is defined as the y direction of an X-Y coordinate system. The central axis 52b of the tip 52 of the present embodiment extends in the extending direction of the trunk portion 54. Additionally, in the cross section described above, the direction in the direction orthogonal to the extending direction extending outward from the stud pin 50 is defined as the x direction of an X-Y coordinate system. Furthermore, in the cross section described above, the position of the protruding base portion 52a of the tip 52 is defined as origin point O of an X-Y coordinate system. In this cross section represented in the X-Y coordinate system, the inclined surface 56b of the recessed surface 56c has either a curved shape or a linear shape corresponding thereto. When defined as such, the inclination angle with respect to the x direction at discretionary position D on the curved or straight line corresponding to the inclined surface 56b is preferably larger than the inclination angle with respect to the x direction at the same position in the x direction as the position D on a parabola B. The parabola B passes on the origin point O and has a focus point at a point 52d on the tip end surface 52c that is located at the same position in the x direction as the origin point O. The parabola B can be expressed by the equation $y = 1/(4p) \cdot x^2$, where p is the distance from the origin point O to the point 52d. The inclination angle of the parabola B at position D is $\tan^{-1}(x1/2p)$ (rad), where the x direction positional coordinate of position D is $x = x1$. Thus, the inclination angle of the inclined surface 56b at the x direction positional coordinate x1 is preferably greater than $\tan^{-1}(x1/2p)$ (rad).

Figure 7:
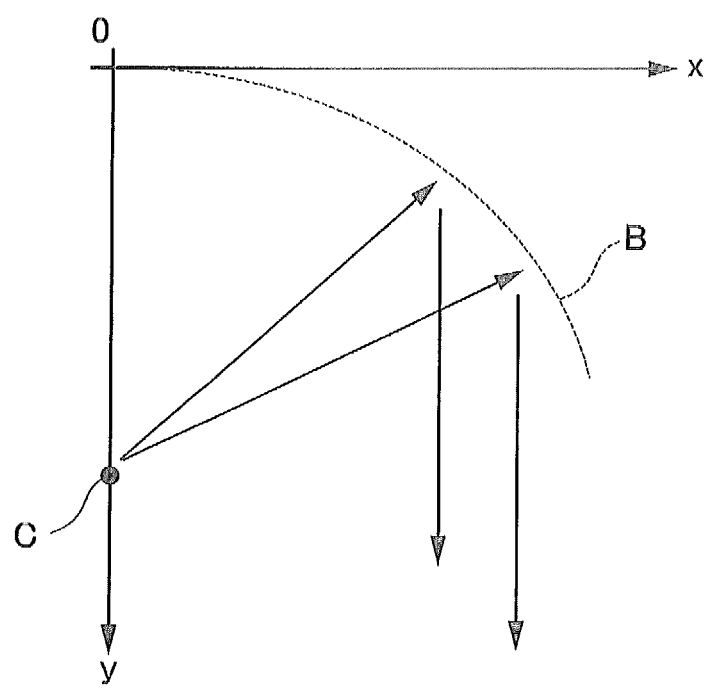
FIG. 7 is a drawing for explaining the relationship between a parabola and a focus point of the parabola.

FIG. 6 is a drawing for explaining the shape of the inclined surface 56b provided in the upper flange 56 of the stud pin 50 of the present embodiment. In FIG. 6, the shape of the recessed surface 56c is illustrated with its dimensions in the y direction enlarged. FIG. 7 is a drawing for explaining the relationship between the parabola B and the focus point C of the parabola B. When particulate elements that travel in a straight line from the focus point C of the parabola B are reflected in a specular reflection-like manner (incident angle=reflection angle) at the parabola B, the particulate elements are reflected in the y direction irrelevant of the position of reflection. Accordingly, by making the inclination angle (absolute value) with respect to the x direction of the inclined surface 56b larger than the inclination angle (absolute value) with respect to the x direction of the curved line of the parabola B at the same position of reflection, the particulate elements, i.e. the ice powder 82, travels in the direction toward the tip 52 (the direction opposite to the x direction) when reflected at the inclined surface 56b, as illustrated in FIG. 6. Thus, the ice powder 82 reflected at the inclined surface 56b is prevented from discharging out from the space enclosed by the recessed surface 56c and the icy road surface 80. Additionally, formation of a layer of ice powder 82 between the tip 52 and the icy road surface 80 is prevented.

WORKING EXAMPLES, CONVENTIONAL EXAMPLE

Stud pins with and without the recessed surface 56c of the upper flange 56, and with varying shapes of the recessed surface 56c were manufactured. The manufactured stud pins were embedded in tires 10 with the configuration illustrated in FIGS. 1 to 3 and these studded tires were mounted to a passenger vehicle and tested for performance on ice.

The size of each manufactured tire was 205/55R16. The passenger vehicle used was a front-wheel drive sedan with an engine displacement of 2000 cc. The internal pressure condition of the tires was 230 (kPa) for both the front wheels and rear wheels. The load condition of the tires was a 450 kg load on each front wheel and a 300 kg load on each rear wheel.

The performance on ice was obtained as follows:

the distance (breaking distance) the passenger vehicle travelling at 40 km/hour takes to stop when the brake pedal is pushed to the maximum travel point with a fixed force was measured a plurality of times (five times) and the average value of the measurement values was obtained. The inverses of the average values for each of the examples were expressed as index values with the inverse of the average value of the Conventional Example described below taken as the reference (index value of 100). A greater index value indicates shorter braking distance and superior performance on ice.

In Tables 1 and 2, "linear shape" for "shape of inclined surface 56b" refers to the inclined surface 56b having a linear shape that becomes deeper at a constant ratio with advancement toward the protruding base portion 52a of the tip 52, when viewed in the cross section illustrated in FIG. 5. "Curved shape" refers to the inclined surface 56b having a curved shape with the inclination angle of the inclined surface 56b decreasing with advancement toward the protruding base portion 52a of the tip 52 as illustrated in FIG. 5, when viewed in the cross section illustrated in FIG. 5.

In Tables 1 and 2, "absent" for "flat surface" refers to the shape of the edge of the recessed surface 56c conforming to the shape of the edge of the upper flange 56 when viewed in the extending direction of the trunk portion 54.

Note that the Conventional Example was the stud pin 50 illustrated in FIG. 4A except that the recessed surface 56c was not provided. Working Examples 1 to 10 were the stud pins 50 illustrated in FIG. 4A given the varying specifications shown in Tables 1 and 2.

The Conventional Example having "absent" for the recessed surface 56c refers to the upper end surface of the upper flange of the stud pin being a flat surface.

TABLE 1

|  | Conventional Example | Working Example 1 | Working Example 2 | Working Example 3 | Working Example 4 | Working Example 5 |
|---|---|---|---|---|---|---|
| Recessed surface 56c | Absent | Present | Present | Present | Present | Present |
| Shape of inclined surface 56b | — | Linear shape | Curved shape | Curved shape | Curved shape | Curved shape |
| Flat surface 56d | — | Absent | Absent | Present | Present | Present |
| Depth D | — | 0.2 mm | 0.2 mm | 0.2 mm | 0.3 mm | 0.5 mm |
| Distance W2/Distance W1 | — | 0 | 0 | 0.3 | 0.3 | 0.3 |
| Performance on ice | 100 | 103 | 105 | 106 | 108 | 109 |

TABLE 2

|  | Working Example 6 | Working Example 7 | Working Example 8 | Working Example 9 | Working Example 10 |
|---|---|---|---|---|---|
| Recessed surface 56c | Present | Present | Present | Present | Present |
| Shape of inclined surface 56b | Curved shape | Curved shape | Curved shape | Curved shape | Curved shape |
| Flat surface 56d | Present | Present | Present | Present | Present |
| Depth D | 1.5 mm | 2.0 mm | 2.3 mm | 0.5 mm | 0.5 mm |
| Distance W2/Distance W1 | 0.3 | 0.3 | 0.3 | 0.5 | 0.2 |
| Performance on ice | 110 | 110 | 110 | 110 | 107 |

As is seen from the evaluate results shown in Tables 1 and 2 for performance on ice of Working Examples 1 to 10, providing the recessed surface 56c on the upper end surface 56a of the upper flange 56 improves the performance on ice.

As is seen by comparing Working Examples 1 and 2, to improve the performance on ice, the shape of the inclined surface 56b is preferably a shape by which the inclination angle of the inclined surface 56b decreases with advancement toward the protruding base portion 52a of the tip 52.

As is seen by comparing Working Examples 2 and 3, to improve the performance on ice, the flat surface 56d is preferably provided to surround the edge of the recessed surface 56c.

As is seen by comparing Working Examples 3 to 8, to improve the performance on ice, the depth D is preferably 0.3 mm or greater.

As is seen by comparing Working Examples 5, 9, and 10, to improve the performance on ice, distance W2/distance W1 is preferably 0.3 or greater. Additionally, better performance on ice is achieved by setting distance W2/distance W1 to from 0.3 to 0.5, both inclusive.

A stud pin and a pneumatic tire of the present technology have been described above. However, it should be understood that the present technology is not limited to the above embodiments and examples, and may be improved or modified in various ways so long as these improvements or modifications remain within the scope of the present technology.

The invention claimed is:

1. A stud pin embeddable in a pin embedding hole provided in a tread portion of a pneumatic tire, the stud pin comprising:
    a tip including a tip end surface configured to come into contact with a road surface; and
    a trunk portion that supports the tip and extends in one direction,
    the trunk portion including:
        an upper flange disposed at a first end of the trunk portion, the tip being fixed to the upper flange; and
        a lower flange disposed at a position to a side opposite the upper flange of the trunk portion; wherein
    an upper end surface of the upper flange from which the tip protrudes includes a recessed surface, the recessed surface including a smooth inclined surface recessing in a curved manner or a linear manner toward the lower flange with advancement toward a protruding base portion of the tip, and
    a ratio W2/W1 of a distance W2 with respect to a distance W1 is 0.3 to 0.5,
    where the distance W1 is a distance along a straight line orthogonal to and passing through a central axis of the tip that extends in an extending direction of the trunk portion from an edge of the upper flange to a position at the protruding base portion of the tip, and
    the distance W2 is a distance along the straight line from a position where the recessed surface begins to recess to a position at the protruding base portion of the tip.

2. The stud pin according to claim 1, wherein an inclination angle of the inclined surface with respect to an orthogonal plane orthogonal to an extending direction of the trunk portion decreases with advancement toward the protruding base portion of the tip.

3. The stud pin according to claim 2, wherein the upper end surface includes a flat surface orthogonal to an extending direction of the trunk portion, and the recessed surface is surrounded by the flat surface.

4. The stud pin according to claim 3, wherein a depth at a most recessed position of the recessed surface is from 0.3 mm to 2.0 mm, both inclusive.

5. The stud pin according to claim 4, wherein
    in a cross section of the upper flange and the tip taken along a plane parallel to and including a central axis of the tip that extends in an extending direction of the trunk portion, the cross section being represented in an X-Y coordinate system where the extending direction toward the tip end surface is defined as a y direction, a direction orthogonal to the extending direction extending outward from the stud pin is defined as an x direction, and a position of the protruding base portion of the tip is defined as an origin point of the X-Y coordinate system, an inclination angle with respect to an x direction at a discretionary position D on a curved or a straight line corresponding to the inclined surface is larger than an inclination angle with respect to the x direction at a same position in the x direction as the position D on a parabola, the parabola passing on the origin point and having a focus point at a point on the tip end surface that is located at a same position in the x direction as the origin point.

6. A pneumatic tire comprising:
a tread portion provided with pin embedding holes; and
stud pins according to the stud pin of claim 5 installed in the pin embedding holes.

7. The stud pin according to claim 1, wherein the upper end surface includes a flat surface orthogonal to an extending direction of the trunk portion, and the recessed surface is surrounded by the flat surface.

8. The stud pin according to claim 1, wherein a depth at a most recessed position of the recessed surface is from 0.3 mm to 2.0 mm, both inclusive.

9. The stud pin according to claim 1, wherein
in a cross section of the upper flange and the tip taken along a plane parallel to and including a central axis of the tip that extends in an extending direction of the trunk portion, the cross section being represented in an X-Y coordinate system where the extending direction toward the tip end surface is defined as a y direction, a direction orthogonal to the extending direction extending outward from the stud pin is defined as an x direction, and a position of the protruding base portion of the tip is defined as an origin point of the X-Y coordinate system, an inclination angle with respect to an x direction at a discretionary position D on a curved or a straight line corresponding to the inclined surface is larger than an inclination angle with respect to the x direction at a same position in the x direction as the position D on a parabola, the parabola passing on the origin point and having a focus point at a point on the tip end surface that is located at a same position in the x direction as the origin point.

10. A pneumatic tire comprising:
a tread portion provided with pin embedding holes; and
stud pins according to the stud pin of claim 1 installed in the pin embedding holes.

* * * * *